United States Patent
Lee (10) Patent No.: US 11,769,874 B2
(45) Date of Patent: Sep. 26, 2023

(54) ALL-SOLID SECONDARY BATTERY (71) Applicant: Samsung SDI Co., Ltd., Yongin-si (KR)

(72) Inventor: Minsuk Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 102 days.

(21) Appl. No.: 17/090,597

(22) Filed: Nov. 5, 2020

(65) Prior Publication Data

US 2021/0143413 A1 May 13, 2021

(30) Foreign Application Priority Data

Nov. 11, 2019 (KR) .................. 10-2019-0143658

(51) Int. Cl.
*H01M 4/00* (2006.01)
*H01M 4/36* (2006.01)
*H01M 4/66* (2006.01)
*H01M 4/134* (2010.01)
*H01M 10/0525* (2010.01)
*H01M 4/133* (2010.01)

(52) U.S. Cl.
CPC .......... *H01M 4/366* (2013.01); *H01M 4/133* (2013.01); *H01M 4/134* (2013.01); *H01M 4/364* (2013.01); *H01M 4/661* (2013.01); *H01M 10/0525* (2013.01); *H01M 2300/0028* (2013.01); *H01M 2300/0071* (2013.01)

(58) Field of Classification Search
CPC .. H01M 4/133; H01M 10/0525; H01M 4/366; H01M 4/131; H01M 4/134; H01M 4/661
See application file for complete search history.

(56) References Cited

U.S. PATENT DOCUMENTS 9,017,864 B2  4/2015  Kimura et al.
11,056,716 B2  7/2021  Ito et al.
(Continued)

FOREIGN PATENT DOCUMENTS

JP  2010225511 A  10/2010
JP  2017130281 A  7/2017
(Continued)

OTHER PUBLICATIONS

Japanese Office action dated Oct. 26, 2021, in corresponding JP Patent Application No. 2020-187990 (5 pages).
(Continued)

*Primary Examiner* — Cynthia H Kelly
*Assistant Examiner* — Monique M Wills
(74) *Attorney, Agent, or Firm* — Lewis Roca Rothgerber Christie LLP (57) ABSTRACT

An all-solid secondary battery includes a cathode layer; an anode layer; and a solid electrolyte layer disposed between the cathode layer and the anode layer. The cathode layer includes a cathode current collector and a cathode active material layer disposed on the cathode current collector, the anode layer includes an anode current collector and a first anode active material layer disposed on the anode current collector, the cathode active material layer includes a porous oxide-based composite solid electrolyte, and the solid electrolyte layer includes a sulfide-based solid electrolyte.

20 Claims, 4 Drawing Sheets (56) References Cited

U.S. PATENT DOCUMENTS

| | | | | |
|---|---|---|---|---|
| 2014/0072836 A1* | 3/2014 | Mills | ............... | H01M 4/8626 |
| | | | | 429/422 |
| 2014/0322605 A1 | 10/2014 | Oh et al. | | |
| 2016/0133916 A1* | 5/2016 | Zagars | ............... | H01M 4/0407 |
| | | | | 429/162 |
| 2017/0207482 A1 | 7/2017 | Tomura et al. | | |
| 2019/0051925 A1 | 2/2019 | Li et al. | | |
| 2019/0051933 A1 | 2/2019 | Li et al. | | |
| 2019/0157723 A1 | 5/2019 | Suzuki et al. | | |
| 2019/0260065 A1 | 8/2019 | Yashiro et al. | | |
| 2019/0305370 A1* | 10/2019 | Minamida | ............ | H01M 10/052 |
| 2021/0273228 A1* | 9/2021 | Hashim | ............ | H01M 10/4235 |

FOREIGN PATENT DOCUMENTS

| | | |
|---|---|---|
| JP | 2019-087348 A | 6/2019 |
| JP | 2019-96610 A | 6/2019 |
| JP | 2019145299 A | 8/2019 |
| KR | 10-1560862 B1 | 10/2015 |
| KR | 10-2016-0064942 A | 6/2016 |
| KR | 10-2019-0017649 A | 2/2019 |
| KR | 10-2019-0017661 A | 2/2019 |
| WO | 2018088193 A1 | 5/2018 |
| WO | WO 2019-103008 A1 | 5/2019 |

OTHER PUBLICATIONS

Vereecken, Philippe M., et al., "Mechanism Analysis of Enhanced Li-Ion Conductivity in Mesoporous Silica-Based Solid Nano-Composite Electrolytes," ECS Meeting Abstracts, vol. MA2018-02, 2018, 4 pages.

Han, Lei, et al., "An ordered mesoporous silica framework based electrolyte with nanowetted interfaces for solid-state lithium batteries," Journal of Materials Chemistry A, 2018, pp. 21280-21286.

Decision of Rejection dated Mar. 22, 2023, in corresponding JP Patent Application No. 2020-187990 (5 pages).

Japanese Office Action dated Jun. 7, 2022, issued in the corresponding Japanese Patent Application No. 2020-187990 (9 pages).

\* cited by examiner

ALL-SOLID SECONDARY BATTERY

CROSS-REFERENCE TO RELATED APPLICATION

This application claims priority to and the benefit of Korean Patent Application No. 10-2019-0143658, filed on Nov. 11, 2019, in the Korean Intellectual Property Office, the entire content of which is incorporated herein by reference.

BACKGROUND

1. Field

One or more aspects of embodiments of the present disclosure relate to an all-solid secondary battery.

2. Description of Related Art

Recently, in accordance with industrial demand, batteries having high energy density and high safety are being actively developed. For example, lithium-ion batteries have been put to practical use in the automotive field as well as in information-related equipment and communication equipment. In the field of automobiles, safety is particularly important because it relates to life. Currently available lithium-ion batteries use a liquid electrolytic layer (e.g., organic solvent-based electrolyte) between a cathode layer (or cathode) and an anode layer (or anode), and thus, when a short-circuit occurs, there is a possibility of overheating and/or the occurrence of a fire. In this regard, an all-solid secondary battery using a solid electrolyte instead of a liquid electrolytic layer has been proposed. In the all-solid secondary battery, a liquid electrolytic layer is not used, and thus the possibility of a fire or an explosion even when a short-circuit occurs should be reduced. Therefore, such an all-solid secondary battery should have greatly increased safety, compared to a lithium-ion battery using a liquid electrolyte layer.

SUMMARY

One or more aspects of embodiments of the present disclosure are directed toward a novel all-solid secondary battery, in which a cathode layer and a solid electrolyte layer include electrolytes different from each other.

Additional aspects will be set forth in part in the description which follows and, in part, will be apparent from the description, or may be learned by practice of the presented embodiments of the disclosure.

One or more example embodiments of the present disclosure provide:

an all-solid secondary battery including a cathode layer; an anode layer; and a solid electrolyte layer disposed between the cathode layer and the anode layer, wherein the cathode layer includes a cathode current collector and a cathode active material layer disposed on the cathode current collector, wherein the anode layer includes an anode current collector and a first anode active material layer disposed on the anode current collector, wherein the cathode active material layer includes a porous oxide-based composite solid electrolyte, and wherein the solid electrolyte layer includes a sulfide-based solid electrolyte.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description. As used herein, the term "and/or" includes any and all combinations of one or more of the associated listed items. Expressions such as "at least one of," "one of," and "selected from," when preceding a list of elements, modify the entire list of elements and do not modify the individual elements of the list.

The term "average particle diameter" as used to describe particles may refer to a volume-converted median diameter (D50) measured using a laser-diffraction particle size distribution meter.

An all-solid secondary battery including a sulfide-based solid electrolyte may be prepared by stacking a cathode layer, an anode layer, and a solid electrolyte layer to prepare a stack, and then pressing the stack. However, because the compositions of the cathode layer, the anode layer, and the solid electrolyte layer are different from one another, the physical properties (such as elastic modulus) of the cathode layer, the anode layer, and the solid electrolyte layer may be different from one another. Therefore, the pressures used (e.g., required or desired) to suitably mold the cathode layer, the anode layer, and the solid electrolyte layer may also be different from one another. For example, the cathode layer may include a cathode active material and a sulfide-based solid electrolyte, and a high pressure may be used (e.g., desired) to decrease interfacial resistance between the cathode active material and the sulfide-based solid electrolyte (e.g., between the two materials in the cathode layer composition). As a result, a pressure required to mold the cathode active material layer may be higher than a pressure required to mold the solid electrolyte layer and the anode layer. Thus, when a pressure suitable or appropriate to mold the cathode active material layer is applied to the stack, the pressure may be higher than that suitable to form the anode layer and/or solid electrolyte layer. Accordingly, cracks may be generated in the anode layer and/or in the solid electrolyte layer, and a short circuit may thus occur in the all-solid secondary battery.

In some embodiments, an all-solid secondary battery including a sulfide-based solid electrolyte may be, for example, prepared by separately preparing a cathode layer, an anode layer, and a solid electrolyte layer with pressures different from one another and simply assembling the layers (e.g., after separately preparing each layer). In this case, a surface of the cathode layer molded with the highest pressure may be sintered to the highest degree. However, in this simply assembled all-solid secondary battery, interfacial resistance between the cathode layer and the solid electrolyte layer may increase, and the all-solid secondary battery may thus have poor cycle characteristics.

According to an aspect of an embodiment of the present disclosure, when an all-solid secondary battery has a composition as described herein, short-circuits during charging/discharging of the battery may be prevented or reduced, and cycle characteristics of the battery may be improved.

The present disclosure allows for various changes and numerous embodiments, and example embodiments will be illustrated in the drawings and described in more detail in the written description. However, this is not intended to limit the present disclosure to particular modes of practice, and it is to be appreciated that all changes, equivalents, and substitutes that do not depart from the spirit and technical scope are encompassed in the present disclosure.

The terms used herein are merely used to describe example embodiments, and are not intended to limit the present disclosure. An expression used in the singular (including terms such as "a," "an," and "the") encompasses the expression of the plural, unless the context clearly indicates otherwise. As used herein, it is to be understood that terms such as "including," "having," and "comprising" are intended to indicate the existence of features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. The symbol "/" used herein may be interpreted as "and" or "or" according to the context. Further, the use of "may" when describing embodiments of the present disclosure refers to "one or more embodiments of the present disclosure".

In the drawings, the thicknesses of layers and regions may be exaggerated or reduced for clarity. Throughout the specification, it will be understood that when a component, such as a layer, a film, a region, or a plate, is referred to as being "on" another component, the component may be directly on the other component or intervening components may be present thereon. When an element is referred to as being "directly on," "directly connected to," or "directly coupled to" another element, there are no intervening elements present. Throughout the specification, while such terms as "first," "second," etc., may be used to describe various components, such components must not be limited to the above terms. The above terms are used only to distinguish one component from another.

Hereinafter, according to one or more embodiments, an all-solid secondary battery and a method of preparing the all-solid secondary battery will be described in more detail.

[All-Solid Secondary Battery]

According to an embodiment, an all-solid secondary battery includes a cathode layer; an anode layer; and a solid electrolyte layer disposed between the cathode layer and the anode layer, where the cathode layer includes a cathode current collector and a cathode active material layer disposed on the cathode current collector, the anode layer includes an anode current collector and a first anode active material layer disposed on the anode current collector, and the cathode active material layer includes a porous oxide-based composite solid electrolyte. When the cathode active material layer includes a porous oxide-based composite solid electrolyte, and the solid electrolyte layer includes a sulfide-based solid electrolyte, a pressure used (required) for preparation of the all-solid secondary battery may decrease. Therefore, cracks occurring during a preparation process of an all-solid secondary battery may be prevented or reduced. As a result, a short circuit in the all-solid secondary battery may be prevented or reduced, and the cycle characteristics of the all-solid secondary battery may be improved.

Figure 1:
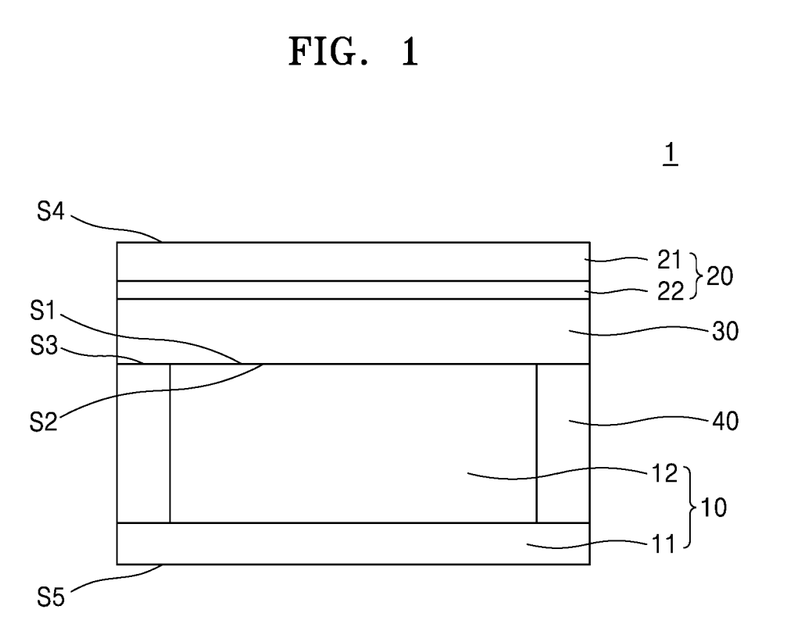
FIG. 1 is a cross-sectional schematic view of an all-solid secondary battery according to an example embodiment.
Figure 2:
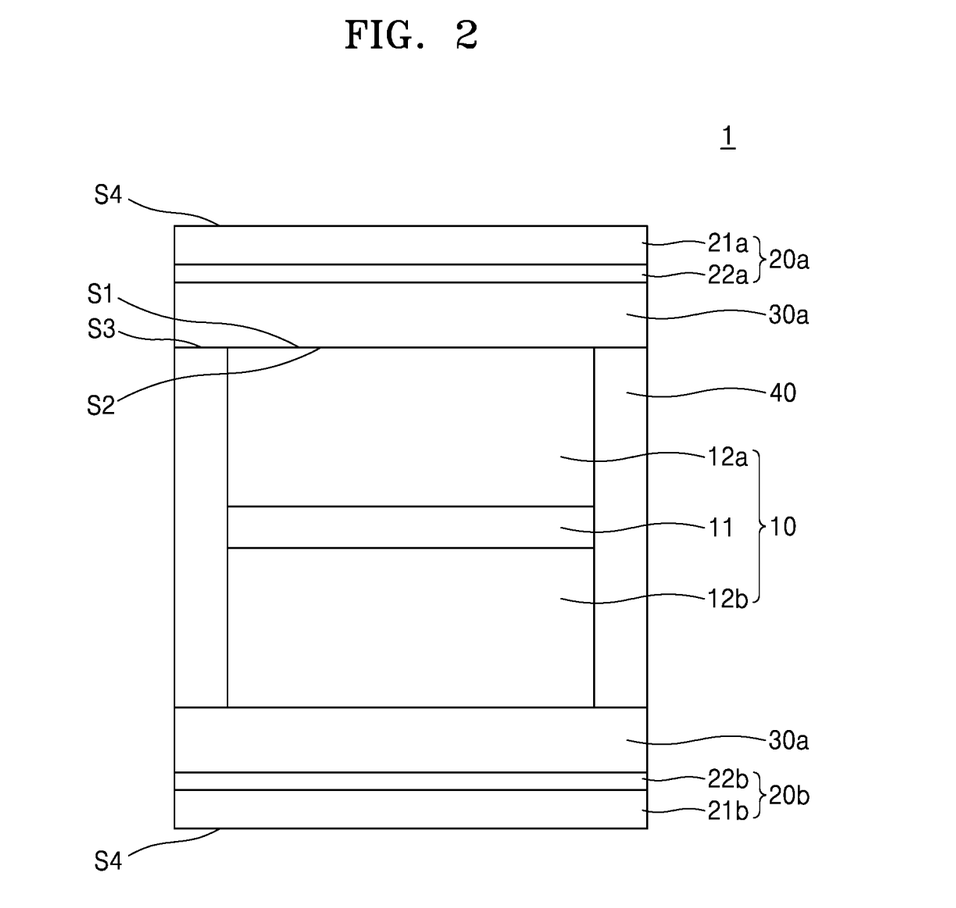
FIG. 2 is a cross-sectional schematic view of an all-solid secondary battery according to another example embodiment.
Figure 3:
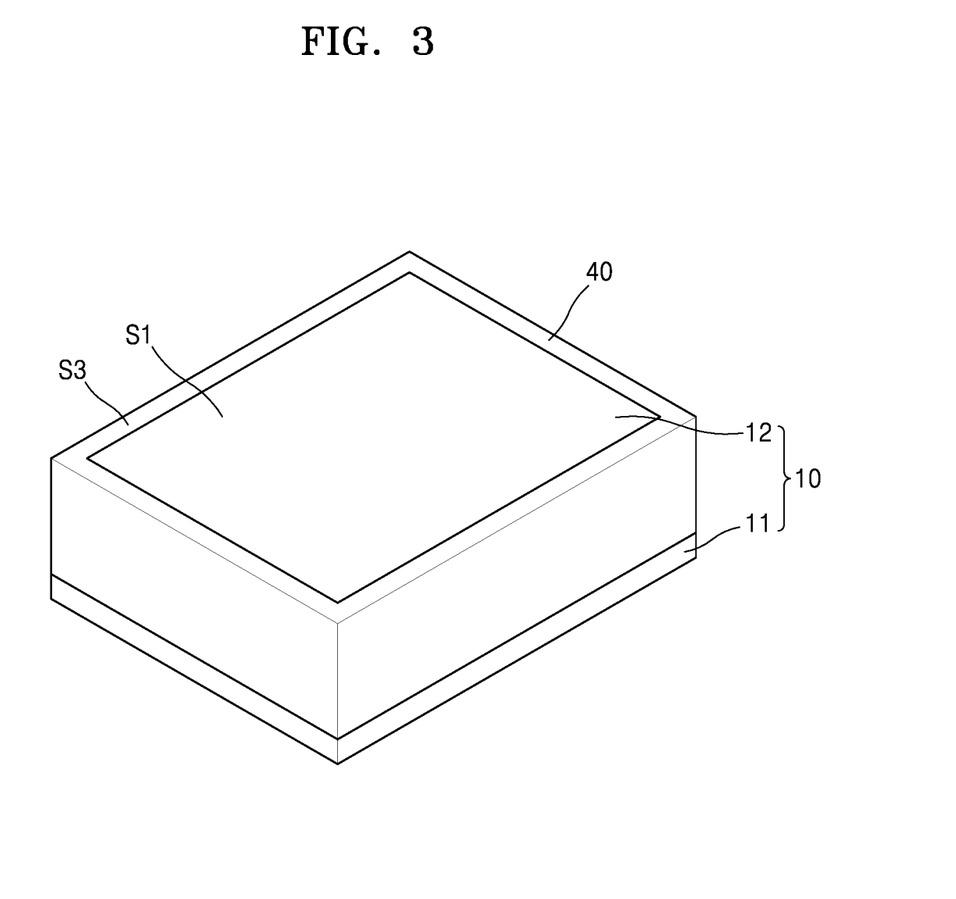
FIG. 3 is a perspective schematic view of a cathode layer of the all-solid secondary battery according to an example embodiment.
Figure 4:
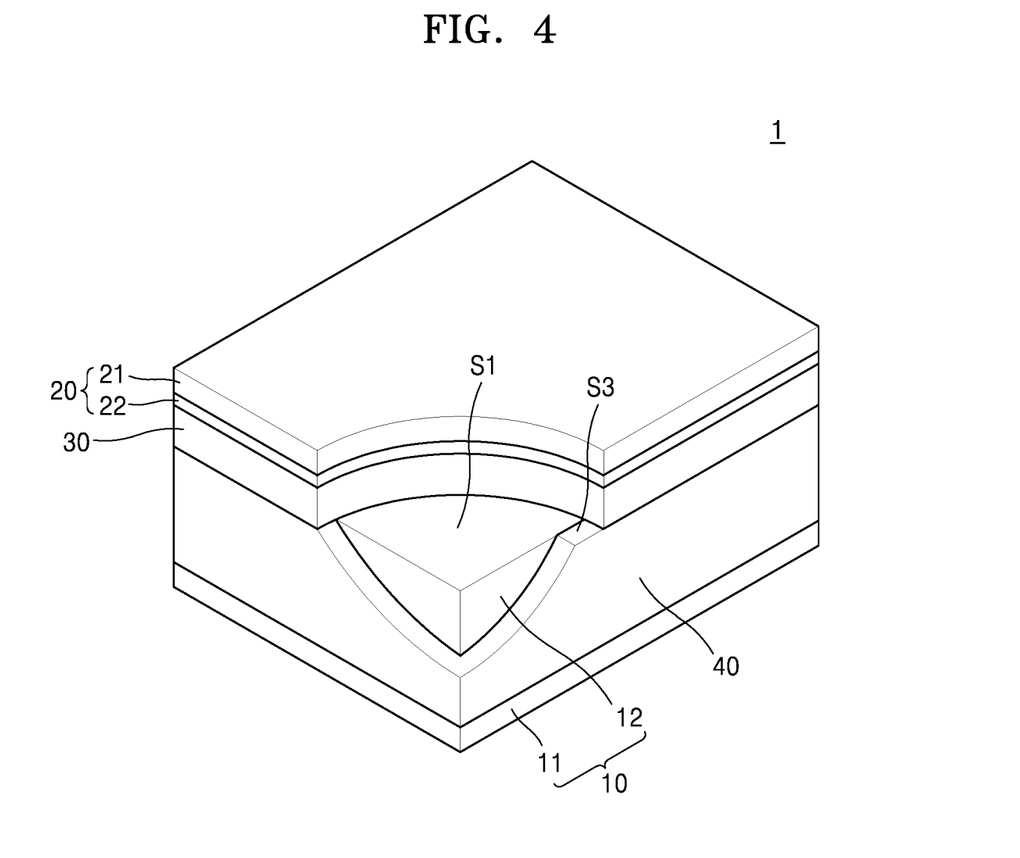
FIG. 4 is a schematic view that shows a part of an inside of the all-solid secondary battery according to an example embodiment.

Referring to FIGS. 1 to 4, an all-solid secondary battery 1 includes a cathode layer 10; an anode layer(s) 20 or 20a and 20b; and a solid electrolyte layer(s) 30 or 30a and 30b disposed between the cathode layer 10 and the anode layer(s) 20 or 20a and 20b. As used herein, the term "anode layer(s) 20 or 20a and 20b" and like terms indicate the presence of one layer 20, or the presence of two layers 20a and 20b. The cathode layer 10 includes a cathode current collector 11, and a cathode active material layer(s) 12 or 12a and 12b disposed on the cathode current collector 11. The anode layer(s) 20 or 20a and 20b include an anode current collector(s) 21 or 21a and 21b, and a first anode active material layer(s) 22 or 22a and 22b disposed on the anode current collector(s) 21 or 21a and 21b. The cathode active material layer(s) 12 or 12a and 12b each include a porous oxide-based composite solid electrolyte, and the solid electrolyte layer(s) 30 or 30a and 30b each include a sulfide-based solid electrolyte. In FIGS. 1, 3, and 4, the cathode active material layer 12 is arranged on one surface of the cathode current collector 11. In FIG. 2, the cathode active material layers 12a and 12b are arranged on opposite surfaces of the cathode current collector 11 (e.g., so that both planar sides of the cathode current collector 11 are coated with the cathode active material).

[Cathode Layer]

[Cathode Layer: Porous Oxide-Based Composite Solid Electrolyte]

Referring to FIGS. 1 to 4, the cathode layer 10 includes the cathode current collector 11 and the cathode active material layer(s) 12 or 12a and 12b disposed on the cathode current collector 11, and the cathode active material layer(s) 12 or 12a and 12b (each) include a porous oxide-based composite solid electrolyte.

When the cathode active material layer(s) 12 or 12a and 12b include a porous oxide-based composite solid electrolyte, a pressure required for preparation of the cathode layer 10 may be decreased than (e.g., compared to) a pressure required for preparation of the solid electrolyte layer(s) 30 or 30a and 30b including a sulfide-based solid electrolyte. Thus, during preparation of an all-solid secondary battery, cracks in the solid electrolyte layer(s) 30 or 30a and 30b including a sulfide-based solid electrolyte occurring under high pressure may be prevented or reduced (e.g., because a high pressure is not applied to the stack for the cathode layer).

The porous oxide-based composite solid electrolyte may include, for example, a porous oxide matrix and an electrolyte in pores of the porous oxide matrix. The porous oxide-based composite solid electrolyte may thereby provide ionic conductivity while maintaining (e.g., being in) a solid state (e.g., by including an ionic conductive electrolyte in pores of an insulating porous oxide matrix). The porous oxide matrix may form (e.g., act as) a framework, and the ionic conductive electrolyte may be disposed within the framework. For example, the porous oxide-based composite solid electrolyte may be provided in a solid powder form before being used in the cathode layer.

The porous oxide matrix may include, for example, at least one selected from $SiO_2$, $Al_2O_3$, $ZrO_2$, $TiO_2$, $ZnO$, $SnO_2$, and $CeO_2$, but embodiments are not limited thereto, and any material available as an oxide having a porous structure in the art may be used. The porous oxide matrix may have, for example, a particle phase (e.g., may include a solid phase having the form of particles). An average particle diameter of the particle phase porous oxide matrix may be, for example about 0.5 µm to about 50 µm, about 1 µm to about 50 µm, about 1 µm to about 40 µm, about 1 µm to about 30 µm, about 1 µm to about 20 µm, about 1 µm to about 10 µm, or about 1 µm to about 5 µm.

For example, the porous oxide matrix may include ordered mesoporous pores. For example, the porous oxide matrix may include periodically arranged pores. An average diameter of the pores in the porous oxide matrix may be, for example, about 1 nm to about 900 nm, about 1 nm to about 500 nm, about 1 nm to about 400 nm, about 1 nm to about 300 nm, about 1 nm to about 200 nm, about 1 nm to about 100 nm, about 1 nm to about 50 nm, about 1 nm to about 40 nm, about 1 nm to about 30 nm, about 1 nm to about 20 nm, or about 1 nm to about 10 nm. The average diameter of the pores in the porous oxide matrix may be measured by, for example, nitrogen adsorption.

An electrolyte in the porous oxide-based composite solid electrolyte may include a lithium salt and a medium (e.g., for dissolving the lithium salt), and the medium may include, for example, at least one selected from an organic solvent and an ionic liquid.

The lithium salt in the electrolyte may be, for example, at least one selected from $LiN(SO_2F)_2$(LiFSI), $LiN(SO_2CF_3)_2$ (LiTFSI), LiSCN, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiSbF_6$, $LiPF_3(CF_2CF_3)_3$, $LiPF_3(CF_3)_3$, and $LiB(C_2O_4)_2$.

The organic solvent in the electrolyte may be, for example, at least one selected from N-methylacetamide, ethylene carbonate, propylene carbonate, dimethyl carbonate, fluoroethylene carbonate, diethyl carbonate, ethylmethyl carbonate, poly(ethylene glycol) dimethyl ether (PEGDME, polyglyme), tetra(ethylene glycol) dimethyl ether (TEGDME, tetraglyme), tri(ethylene glycol)dimethyl ether (triglyme), poly(ethylene glycol) dilaurate (PEGDL), poly(ethylene glycol) monoacrylate (PEGMA), poly(ethylene glycol) diacrylate (PEGDA), 3-dioxolane, 4,5-diethyl-1,3-dioxolane, 4,5-dimethyl-1,3-dioxolane, 4-methyl-1,3-dioxolane, 4-ethyl-1,3-dioxolane, 2,2-dimethoxy-2-phenylacetophenone, 1,2-dimethoxyethane (DME), 1,2-diethoxyethane, tetrahydrofuran, gamma butyrolactone, 1,1,2,2-tetrafluoroethyl 2,2,3,3-tetrafluoropropyl ether, succinonitrile, adiponitrile, sulfolane, dimethylsulfone, ethylmethylsulfone, and diethylsulfone.

The ionic liquid in the electrolyte may be selected from, for example, a compounds including: (a) at least one cation selected from an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, and a mixture thereof; and (b) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $C_2F_5SO_2)_2N^-$, $(C_2F_5SO_2)(CF_3SO_2)N^-$, and $(CF_3SO_2)_2N^-$. The ionic liquid may be, for example, at least one selected from the group consisting of N-methyl-N-propylpyrrolidinium bis(trifluoromethanesulfonyl)imide, N-butyl-N-methylpyrrolidium bis(3-trifluoromethylsulfonyl)imide, 1-butyl-3-methylimidazolium bis(trifluoromethylsulfonyl)amide, and 1-ethyl-3-methylimidazolium bis(trifluoromethylsulfonyl)amide.

An amount of the lithium salt in the electrolyte may be about 1 mol % to about 30 mol %, about 3 mol % to about 30 mol %, about 5 mol % to about 30 mol %, about 10 mol % to about 30 mol %, or about 15 mol % to about 25 mol % with respect to the total amount in moles of the medium and the lithium salt in the electrolyte. When the amount of the lithium salt in the electrolyte is within these ranges, the cycle characteristics of the all-solid secondary battery 1 may further be improved. When the amount of the lithium salt is too low, an internal resistance of the all-solid secondary battery 1 may increase, and the lifespan characteristics of the all-solid secondary battery 1 may thus be deteriorated. When the amount of the lithium salt is too high, some of the lithium salt may be deposited (e.g., precipitated) in a solid state, and thus a porous oxide-based composite solid electrolyte may not be achieved (e.g., at least some of the pores may be blocked by the deposited lithium salt).

For example, the porous oxide-based composite solid electrolyte may include about 50 parts by weight to about 70 parts by weight of the porous oxide matrix, about 20 parts by weight to about 40 parts by weight of the lithium salt, and about 5 parts by weight to about 10 parts by weight of the medium based on about 100 parts by weight of the porous oxide-based composite solid electrolyte. When the porous oxide-based composite solid electrolyte has this composition, the cycle characteristics of the all-solid secondary battery 1 may further be improved.

An amount of the porous oxide-based composite solid electrolyte may be, for example, about 1 weight % (wt %) to about 30 wt %, about 2 wt % to about 28 wt %, about 5 wt % to about 25 wt %, about 7 wt % to about 23 wt %, or about 10 wt % to about 20 wt % based on the total weight of the cathode active material layer(s) 12 or 12a and 12b. When the amount of the porous oxide-based composite solid electrolyte is within these ranges, the cycle characteristics of the all-solid secondary battery 1 may be further improved. When the amount of the porous oxide-based composite solid electrolyte is too low, an amount of lithium ions is too low, and thus battery resistance may increase. When the amount of the porous oxide-based composite solid electrolyte is too high, a discharge capacity of the all-solid secondary battery 1 may decrease.

[Cathode Layer: Inactive Member]

Referring to FIGS. 1 to 4, the cathode layer 10 includes the cathode current collector 11, the cathode active material layer(s) 12 or 12a and 12b disposed on the cathode current collector 11, and an inactive member 40 disposed on at least one side surface of the cathode active material layer(s) 12 or 12a and 12b.

The inactive member 40 is a member (e.g., device element) that does not include an electrochemically active material or electrode active material. An electrode active material is a material capable of absorbing/desorbing or intercalation/deintercalating lithium. The inactive member 40 may be formed of any suitable material in the art that is not an electrode active material.

The inactive member 40 may be disposed on a peripheral part of the cathode current collector 11, may extend to a distal end (e.g., outer edge) of the cathode current collector 11, and may contact the solid electrolyte layer(s) 30 or 30a and 30b while surrounding one or more side surfaces of the cathode active material layer(s) 12 or 12a and 12b. When the inactive member 40 is disposed on a peripheral part of the cathode current collector 11, extends to a distal end of the cathode current collector 11, and contacts the solid electrolyte layer(s) 30 or 30*a* and 30*b* while surrounding the cathode active material layer(s) 12 or 12*a* and 12*b*, crack generation in the solid electrolyte layer(s) 30 or 30*a* and 30*b* by a pressure difference in a part of the solid electrolyte layer(s) 30 or 30*a* and 30*b* that is not in contact with the cathode active material layer(s) 12 or 12*a* and 12*b* during a pressing process may be effectively suppressed.

The inactive member 40 may extend to one or more distal ends of the solid electrolyte layer(s) 30 or 30*a* and 30*b*. When the inactive member 40 extends to distal ends of the solid electrolyte layer(s) 30 or 30*a* and 30*b*, cracks at the distal ends of the solid electrolyte layer(s) 30 or 30*a* and 30*b* may be suppressed or reduced. The distal ends of the solid electrolyte layer(s) 30 or 30*a* and 30*b* are the outermost parts of the battery contacting side surfaces of the solid electrolyte layer(s) 30 or 30*a* and 30*b* (e.g., the distal edges contact the inner perimeter of the battery). For example, the inactive member 40 may extend to the outermost parts of the battery contacting side surfaces of the solid electrolyte layer(s) 30 or 30*a* and 30*b*.

An area (e.g., surface area) S1 of the cathode active material layer(s) 12 or 12*a* and 12*b* may be smaller than an area S2 of the solid electrolyte layer(s) 30 or 30*a* and 30*b* that are in contact with (e.g., facing) the cathode active material layer(s) 12 or 12*a* and 12*b*, and the inactive member 40 may be disposed so that it surrounds one or more, for example all side surface of the cathode active material layer(s) 12 or 12*a* and 12*b*, and may thus correct an area error (e.g., mismatch) between the cathode active material layer(s) 12 or 12*a* and 12*b* and the solid electrolyte layer(s) 30 or 30*a* and 30*b*. When an area S3 of the inactive member 40 (e.g., facing the solid electrolyte layer(s) 30 or 30*a* and 30*b*) corrects a difference between the area S1 of the cathode active material layer(s) 12 or 12*a* and 12*b* and the area S2 of the solid electrolyte layer(s) 30 or 30*a* and 30*b*, cracks generated in the solid electrolyte layer(s) 30 or 30*a* and 30*b* by a pressure difference during a pressing process may be effectively suppressed. For example, the area S1 of the cathode active material layer(s) 12 or 12*a* and 12*b* may be less than about 100%, about 99% or less, about 98% or less, about 95% or less, about 90% or less, about 85% or less, or about 80% or less of the area S2 of the solid electrolyte layer(s) 30 or 30*a* and 30*b*. For example, the area S1 of the cathode active material layer(s) 12 or 12*a* and 12*b* may be about 50% to less than about 100%, about 50% to about 99% or less, about 50% to about 98% or less, about 50% to about 95% or less, about 60% to about 90% or less, about 60% to about 85% or less, or about 60% to about 80% or less of the area S2 of the solid electrolyte layer(s) 30 or 30*a* and 30*b*. When the area S1 of the cathode active material layer(s) 12 or 12*a* and 12*b* is substantially equal to or greater than the area S2 of the solid electrolyte layer(s) 30 or 30*a* and 30*b*, a possibility of a short circuit (occurring by physical contact between the cathode active material layer 12 and the anode active material layer 22 or between the cathode active material layers 12*a* and 12*b* and the anode active material layers 22*a* and 22*b*, and/or due to an overcharge of lithium) may increase.

The inactive member 40 may be disposed between the cathode current collector 11 and the solid electrolyte layer 30, which face each other (e.g., as shown in the structure of FIG. 1), or the inactive member 40 may be disposed between the two solid electrolyte layers 30*a* and 30*b*, which face each other (e.g., as shown in the structure of FIG. 2). The inactive member 40 may serve as a filler that fills a space between the cathode current collector 11 and the solid electrolyte layer 30, which face each other, or between the two solid electrolyte layers 30*a* and 30*b*, which face each other.

The area S1 of the cathode active material layer(s) 12 or 12*a* and 12*b* may be smaller than an area (e.g., planar surface area) S4 of the anode current collector(s) 21 or 21*a* and 21*b*. For example, the area S1 of the cathode active material layer(s) 12 or 12*a* and 12*b* may be less than about 100%, about 99% or less, about 98% or less, about 95% or less, about 90% or less, about 85% or less, or about 80% or less of the area S4 of the anode current collector(s) 21 or 21*a* and 21*b*. For example, the area S1 of the cathode active material layer(s) 12 or 12*a* and 12*b* may be about 50% to less than about 100%, about 50% to about 99% or less, about 50% to about 98% or less, about 50% to about 95% or less, about 60% to about 90% or less, about 60% to about 85% or less, or about 60% to about 80% or less of the area S4 of the anode current collector(s) 21 or 21*a* and 21*b*.

A shape and/or the area S4 of the anode current collector(s) 21 or 21*a* and 21*b* may be the same as a shape and/or an area S5 of the cathode current collector 11. For example, the area S4 of the anode current collector(s) 21 or 21*a* and 21*b* may be about 100±5%, about 100±3%, about 100±2%, about 100±1%, or about 100±0.5% of the area S5 of the cathode current collector 11. A shape and/or the area S5 of the cathode current collector 11 may be the same as a shape and/or the area S2 of the solid electrolyte layer(s) 30 or 30*a* and 30*b*. For example, the area S5 of the cathode current collector 11 may be about 100±5%, about 100±3%, about 100±2%, about 100±1%, or about 100±0.5% of the area S2 of the solid electrolyte layer(s) 30 or 30*a* and 30*b*. As used herein, the "same" area and/or shape includes all cases having "substantially the same" area and/or shape, except when an area and/or a shape is intentionally changed (e.g., described as being intentionally different).

The inactive member 40 may include at least one selected from a lithium ion insulator and a lithium ion conductor. In some embodiments, the inactive member 40 may be or include an electronic insulator. In some embodiments, the inactive member 40 may not be an electronic insulator.

The inactive member 40 may be an organic material, an inorganic material, or an organic-inorganic composite material. The organic material may be, for example, a polymer. The inorganic material may be, for example, a ceramic (such as a metal oxide). The organic-inorganic composite material may be a composite of a polymer and a metal oxide. The inactive member 40 may include, for example, at least one selected from an insulating polymer, an ionic conductive polymer, an insulating inorganic material, an oxide-based solid electrolyte, and a sulfide-based solid electrolyte. The inactive member 40 may be, for example, an olefin-based polymer (such as polypropylene (PP) and/or polyethylene (PE)).

A density of the inactive member 40 may be, for example, about 10% to about 200%, about 10% to about 150%, about 10% to about 140%, about 10% to about 130%, or about 10% to about 120% of a density of a cathode active material included in the cathode active material layer(s) 12 or 12*a* and 12*b*. A density of the inactive member 40 may be, for example, about 90% to about 110% of a density of a cathode active material included in the cathode active material layer(s) 12 or 12*a* and 12*b*. A density of the inactive member 40 may be, for example, substantially similar to a density of a cathode active material included in the cathode active material layer(s) 12 or 12*a* and 12*b*.

The inactive member 40 may be or function as, for example, a gasket. When the inactive member 40 is used as a gasket, cracks generated in the solid electrolyte layer(s) 30 or 30a and 30b by a pressure difference during a pressing process may be effectively suppressed or reduced.

[Cathode Layer: Cathode Active Material]

Referring to FIGS. 1 to 4, the cathode active material layer(s) 12 or 12a and 12b includes a cathode active material.

The cathode active material is a compound capable of reversibly absorbing and desorbing (or intercalating and deintercalating) lithium ions. Non-limiting examples of the cathode active material include a lithium transition metal oxide (such as a lithium cobalt oxide (LCO), a lithium nickel oxide, a lithium nickel cobalt oxide, a lithium nickel cobalt aluminum oxide (NCA), a lithium nickel cobalt manganese oxide (NCM), a lithium manganate, and/or a lithium iron phosphate); a nickel sulfide; a copper sulfide; a lithium sulfide; an iron oxide; and a vanadium oxide, but any suitable material available as a cathode active material in the art may be used. The cathode active material may be used alone or in a mixture of at least two selected from the above examples.

The lithium transition metal oxide may be, for example, a compound represented by one of the following formulae: $Li_aA_{1-b}B'_bD_2$ (where $0.90 \leq a \leq 1$ and $0 \leq b \leq 0.5$); $Li_aE_{1-b}B'_bO_{2-c}D_c$ (where $0.90 \leq a \leq 1$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F''_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F''_2$ (where $0.90 \leq a \leq 1$, $0 \leq b \leq 0.5$, $0 \leq c \leq 0.05$, and $0 < \alpha < 2$); $Li_aN_{i_b}E_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. The compound may have a surface coating layer (hereinafter, also referred to as "coating layer"). In some embodiments, a mixture of a compound without a coating layer and a compound having a coating layer may be used, the compounds being selected from the compounds listed above. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the cathode active material when a compound of the coating element is used. For example, the coating layer may be formed using a spray coating method or a dipping method. The coating methods may be well understood by one of ordinary skill in the art, and thus a detailed description thereof will be omitted.

The cathode active material may include, for example, a lithium transition metal oxide having a layered rock-salt type structure, among the examples of the lithium transition metal oxide. For example, the term "layered rock-salt type structure" refers to a structure in which an oxygen atom layer and a metal atom layer are alternatingly and regularly arranged along the <111> direction in a cubic rock-salt type structure, where each of the atom layers forms a two-dimensional flat plane. The term "cubic rock-salt type structure" refers to a sodium chloride (NaCl) type structure, which is a named crystalline structure, and for example, to a structure in which a face-centered cubic (fcc) lattice respectively formed of anions and cations is shifted by only a half unit of each unit lattice. Non-limiting examples of the lithium transition metal oxide having the layered rock-salt type structure include a ternary lithium transition metal oxide (such as $LiNi_xCo_yAl_zO_2$ (NCA) and/or $LiNi_xCo_yMn_zO_2$ (NCM) (where $0<x<1$, $0<y<1$, $0<z<1$, and $x+y+z=1$)) and $LiNi_xCo_yMn_zAl_wO_2$ (NCMA) (where $0<x<1$, $0<y<1$, $0<z<1$, $0<w<1$, and $x+y+z+w=1$). When the cathode active material includes a ternary transition metal oxide having the layered rock-salt type structure, an energy density and/or thermal stability of the all-solid secondary battery 1 may be improved.

The cathode active material particles may be covered by a coating layer as described above. The coating layer may include any suitable material for a coating layer of a cathode active material in an all-solid secondary battery in the art. The coating layer may be, for example, $Li_2O$—$ZrO_2$ (LZO).

When the cathode active material includes nickel (Ni) as a ternary lithium transition metal oxide (such as NCA and/or NCM), a capacity density of the all-solid secondary battery 1 may increase, and thus metal elution from the cathode active material in a charged state may be reduced. As a result, the all-solid secondary battery 1 according to an embodiment may have improved cycle characteristics in a charged state.

The cathode active material particle may have any suitable shape, for example, a true spherical shape, an elliptical shape, or a spherical shape. The cathode active material may have any suitable particle diameter for a cathode active material of a related art all-solid secondary battery. The cathode active material of the cathode 10 is not particularly limited and may be any suitable amount for a cathode layer of a related art all-solid secondary battery.

[Cathode Layer: Binder]

The cathode active material layer(s) 12 or 12a and 12b may include a binder. Non-limiting examples of the binder include styrene-butadiene rubber (SBR), polytetrafluoroethylene, polyvinylidene fluoride, and polyethylene.

[Cathode Layer: Conducting Agent]

The cathode active material layer(s) 12 or 12a and 12b may include a conducting agent. Non-limiting examples of the conducting agent include graphite, carbon black, acetylene black, ketjen black, carbon fiber, and metal powder.

[Cathode Layer: Other Additives]

The cathode active material layer(s) 12 or 12a and 12b may further include any suitable additive (such as a filler, a coating agent, a dispersant, and/or an ionic conducting agent) in addition to the cathode active material, solid electrolyte, binder, and conductive agent described above.

The filler, coating agent, dispersant, and ion conducting agent that may be included in the cathode active material layer(s) 12 or 12a and 12b may be any suitable material available for an electrode of an all-solid secondary battery in the art.

[Cathode Layer: Cathode Current Collector]

The cathode current collector 11 may use or be, for example, a plate or a foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. In some embodiments, the cathode current collector 11 may be omitted.

The cathode current collector 11 may further include a carbon layer disposed on one surface or two surfaces of a metal substrate (for example, the metal foil described above). When the carbon layer is additionally disposed on the metal substrate, a metal of the metal substrate may be prevented or at least partially protected from being corroded by the solid electrolyte in the cathode layer 10, and interfacial resistance between the cathode active material layer 12 and the cathode current collector 11 or between the cathode current collector 11 and the cathode active material layers 12a and 12b may decrease. A thickness of the carbon layer may be, for example, about 1 μm to about 5 μm. When the thickness of the carbon layer is too thin, contact between the metal substrate and the solid electrolyte may not be completely blocked. When the thickness of the carbon layer is too thick, an energy density of the all-solid secondary battery 1 may be deteriorated. The carbon layer may include amorphous carbon and/or crystalline carbon.

[Solid Electrolyte Layer]

[Solid Electrolyte Layer: Solid Electrolyte]

Referring to FIGS. 1 to 4, the solid electrolyte layer(s) 30 or 30a and 30b may be disposed between the cathode layer 10 and the anode layer(s) 20 or 20a and 20b, and may include a sulfide-based solid electrolyte.

Non-limiting examples of the sulfide-based solid electrolyte include $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—ZmSn (where m and n each are a positive number, and Z represents any of Ge, Zn, and Ga), $Li_2S$—$GeS_2$, $Li_2S$—$SiS_2$—$Li_3PO_4$, $Li_2S$—$SiS_2$—$Li_pMO_q$ (where p and q each are a positive number of greater than 0 to 10, and M represents any of P, Si, Ge, B, Al, Ga, and In), $Li_{7-x}PS_{6-x}Cl_x$ (where 0≤x≤2), $Li_{7-x}PS_{6-x}Br_x$ (where 0≤x≤2), and $Li_{7-x}PS_{6-x}I_x$ (where 0≤x≤2). The sulfide-based solid electrolyte may be prepared by melting and quenching starting (reactant) materials (e.g., $Li_2S$ or $P_2S_5$), or mechanically milling the starting materials. The resultant may subsequently be heat-treated. The sulfide-based solid electrolyte may be amorphous, crystalline, or in a mixed form thereof. In some embodiments, the sulfide-based solid electrolyte may include at least sulfur (S), phosphorus (P), and lithium (Li) as component elements within the sulfide-based solid electrolyte material. For example, the sulfide-based solid electrolyte may be a material including $Li_2S$—$P_2S_5$. Here, when the material including $Li_2S$—$P_2S_5$ is used as a sulfide-based solid electrolyte material, a mixing molar ratio of $Li_2S$ and $P_2S_5$ ($Li_2S$:$P_2S_5$) may be, for example, about 50:50 to about 90:10.

In some embodiments, the sulfide-based solid electrolyte may include, for example, an argyrodite-type solid electrolyte represented by Formula 1:

$$Li^+{}_{12-n-x}A^{n+}X^{2-}{}_{6-x}Y^-{}_x. \quad \text{Formula 1}$$

In Formula 1, A may be P, As, Ge, Ga, Sb, Si, Sn, Al, In, Ti, V, Nb, or Ta, X may be S, Se, or Te, Y may be Cl, Br, I, F, CN, OCN, SCN, or $N_3$, 1≤n≤5, and 0≤x≤2. The sulfide-based solid electrolyte may be an argyrodite-type solid electrolyte including at least one selected from $Li_{7-x}PS_{6-x}Cl_x$ (where 0≤x≤2), $Li_{7-x}PS_{6-x}Br_x$ (where 0≤x≤2), and $Li_{7-x}PS_{6-x}I_x$ (where 0≤x≤2). The sulfide-based solid electrolyte may be, for example, an argyrodite-type solid electrolyte including at least one selected from $Li_6PS_5Cl$, $Li_6PS_5Br$, and $Li_6PS_5I$.

A density of the argyrodite-type solid electrolyte may be about 1.5 g/cc to about 2.0 g/cc. When the density of the argyrodite-type solid electrolyte is about 1.5 g/cc or higher, internal resistance of the all-solid secondary battery 1 may decrease, and penetration of the solid electrolyte layer(s) 30 or 30a and 30b by Li may be effectively suppressed or reduced.

An elastic modulus (e.g., Young's modulus) of the sulfide-based solid electrolyte may be, for example, about 35 GPa or lower, about 30 GPa or lower, about 27 GPa or lower, about 25 GPa or lower, or about 23 GPa or lower. An elastic modulus (e.g., Young's modulus), of the sulfide-based solid electrolyte may be, for example, about 10 GPa to about 35 GPa, about 10 GPa to about 30 GPa, about 10 GPa to about 27 GPa, about 10 GPa to about 25 GPa, or about 10 GPa to about 23 GPa. When the elastic modulus of the sulfide-based solid electrolyte is within these ranges, a temperature and/or a pressure required for sintering may decrease, and thus sintering of the solid electrolyte may be easily performed.

[Solid Electrolyte Layer: Binder]

The solid electrolyte layer(s) 30 or 30a and 30b may include, for example, a binder. Non-limiting examples of the binder in the solid electrolyte layer(s) 30 or 30a and 30b include styrene-butadiene rubber (SBR), polytetrafluoroethylene, polyvinylidene fluoride, and polyethylene, but any material available as a binder in the art may be used. The binder of the solid electrolyte layer(s) 30 or 30a and 30b may be identical to or different from the binders in the cathode active material layer(s) 12 or 12a and 12b and the first anode active material layer(s) 22 or 22a and 22b.

[Anode Layer]

[Anode Layer: Anode Active Material]

The anode layer(s) 20 or 20a and 20b include the anode current collector(s) 21 or 21a and 21b and the first anode active material layer(s) 22 or 22a and 22b disposed on the anode current collector(s) 21 or 21a and 21b, and the first anode active material layer(s) 22 or 22a and 22b may include, for example, an anode active material and a binder.

The anode active material in the first anode active material layer(s) 22 or 22a and 22b may be, for example, in the form of particles. An average particle diameter of the anode active material in the form of particles may be, for example, about 4 μm or less, about 3 μm or less, about 2 μm or less, about 1 μm or less, or about 900 nm or less. An average particle diameter of the anode active material in the form of particles may be, for example, about 10 nm to about 4 µm or less, about 10 nm to about 3 µm or less, about 10 nm to about 2 µm or less, about 10 nm to about 1 µm or less, or about 10 nm to about 900 nm or less. When the average particle diameter of the anode active material is within these ranges, reversible absorbing and/or desorbing of lithium during charging/discharging may be further facilitated. The average particle diameter of the anode active material may be, for example, a median diameter (D50) measured using a laser diffraction particle diameter distribution meter.

The anode active material in the first anode active material layer(s) 22 or 22a and 22b may include, for example, at least one selected from a carbonaceous anode active material and a metal or metalloid anode active material.

The carbonaceous anode active material may be an amorphous carbon. Non-limiting examples of the amorphous carbon include carbon black (CB), acetylene black (AB), furnace black (FB), ketjen black (KB), and graphene, but any material available as amorphous carbon in the art may be used. The amorphous carbon may be carbon having little crystallinity or a very low crystallinity, which is different from crystalline carbon or graphene-based carbon.

Non-limiting examples of the metal or metalloid anode active material may include at least one selected from the group consisting of gold (Au), platinum (Pt), palladium (Pd), silicon (Si), silver (Ag), aluminum (Al), bismuth (Bi), tin (Sn), and zinc (Zn), but any material available as a metal anode active material or a metalloid anode active material capable of forming an alloy or a compound with lithium in the art may be used. For example, nickel (Ni) does not form an alloy with lithium and thus is not a metal anode active material.

The first anode active material layer(s) 22 or 22a and 22b may include one anode active material or may include a mixture of a plurality of different anode active materials selected from these anode active materials. For example, the first anode active material layer(s) 22 or 22a and 22b may only include amorphous carbon or may include at least one selected from the group consisting of gold (Au), platinum (Pt), palladium (Pd), silicon (Si), silver (Ag), aluminum (Al), bismuth (Bi), tin (Sn), and zinc (Zn). In some embodiments, the first anode active material layer(s) 22 or 22a and 22b may include a mixture including amorphous carbon and at least one selected from the group consisting of gold (Au), platinum (Pt), palladium (Pd), silicon (Si), silver (Ag), aluminum (Al), bismuth (Bi), tin (Sn), and zinc (Zn). A mixing ratio (weight ratio) of the amorphous carbon and gold may be, for example, about 10:1 to about 1:2, about 5:1 to about 1:1, or about 4:1 to about 2:1, but embodiments are not limited thereto, and the mixing ratio may be selected according to suitable characteristics of the all-solid secondary battery 1. When the anode active material has the above-described composition, the cycle characteristics of the all-solid secondary battery 1 may be further improved.

The anode active material in the anode active material layer(s) 22 or 22a and 22b may include, for example, a mixture including first particles formed of amorphous carbon and second particles formed of a metal or a metalloid. Non-limiting examples of the metal or metalloid include gold (Au), platinum (Pt), palladium (Pd), silicon (Si), silver (Ag), aluminum (Al), bismuth (Bi), tin (Sn), and zinc (Zn). In some embodiments, the metalloid may be a semiconductor. An amount of the second particles may be about 8 weight % to about 60 weight %, about 10 weight % to about 50 weight %, about 15 weight % to about 40 weight %, or about 20 weight % to about 30 weight % based on the total weight of the mixture. When the amount of the second particles is within these ranges, for example, the cycle characteristics of the all-solid secondary battery 1 may further improve.

[Anode Layer: Binder]

Non-limiting examples of the binder in the first anode active material layer(s) 22 or 22a and 22b include styrene-butadiene rubber (SBR), polytetrafluoroethylene, polyvinylidene fluoride, polyethylene, a vinylidene fluoride/hexafluoropropylene copolymer, polyacrylonitrile, and polymethylmethacrylate, but any material available as a binder in the art may be used The binder may be a single binder or a plurality (mixture) of different binders.

When the first anode active material layer 22 includes the binder, the first anode active material layer(s) 22 or 22a and 22b may be stabilized on the anode current collector(s) 21 or 21a and 21b. Also, cracks in the first anode active material layer(s) 22 or 22a and 22b may be suppressed or reduced in spite of volume changes and/or relative location changes of the first anode active material layer(s) 22 or 22a and 22b during charging/discharging. For example, when the first anode active material layer(s) 22 or 22a and 22b do not include a binder, the first anode active material layer(s) 22 or 22a and 22b may be easily separated from the anode current collector(s) 21 or 21a and 21b. When a part of the anode current collector(s) 21 or 21a and 21b is exposed by the separation of the first anode active material layer(s) 22 or 22a and 22b, the anode current collector(s) 21 or 21a and 21b may contact (e.g., directly contact) the solid electrolyte layer 30, and a possibility of short-circuit occurrence may increase. The first anode active material layer(s) 22 or 22a and 22b may be prepared by, for example, coating and drying a slurry (in which materials forming the first anode active material layer(s) 22 or 22a and 22b are dispersed) on the anode current collector(s) 21 or 21a and 21b. When the binder is included in the first anode active material layer(s) 22 or 22a and 22b, the anode active material may be stably dispersed in the slurry. For example, when the slurry is coated on the anode current collector(s) 21 or 21a and 21b using a screen printing method, clogging of the screen (e.g., clogging by an aggregate of the anode active material) may be suppressed or reduced.

[Anode Layer: Other Additives]

The first anode active material layer(s) 22 or 22a and 22b may further include additives that are used in a conventional all-solid secondary battery (such as a filler, a coating agent, a dispersant, and/or an ionic conducting agent).

[Anode Layer: First Anode Active Material Layer]

A thickness of the first anode active material layer(s) 22 or 22a and 22b may be, for example, about 50% or less, about 40% or less, about 30% or less, about 20% or less, about 10% or less, or about 5% or less of a thickness of the cathode active material layer(s) 12 or 12a and 12b. For example, a thickness of the first anode active material layer(s) 22 or 22a and 22b may be about 1 µm to about 20 µm, about 2 µm to about 10 µm, or about 3 µm to about 7 µm. When the thickness of the first anode active material layer(s) 22 or 22a and 22b is too thin, lithium dendrites may form between the first anode active material layer(s) 22 or 22a and 22b and the anode current collector(s) 21 or 21a and 21b and may destroy the first anode active material layer(s) 22 or 22a and 22b, and thus the cycle characteristics of the all-solid secondary battery 1 may not be improved. When the thickness of the first anode active material layer(s) 22 or 22a and 22b is too thick, an energy density of the all-solid secondary battery 1 may be deteriorated and internal resistance of the all-solid secondary battery 1 by the first anode active material layer(s) 22 or 22a and 22b may increase, and thus cycle characteristics of the all-solid secondary battery 1 may not be improved.

For example, when the thickness of the first anode active material layer(s) 22 or 22a and 22b decreases, a charge capacity of the first anode active material layer(s) 22 or 22a and 22b may also decrease. The charge capacity of the first anode active material layer(s) 22 or 22a and 22b may be, for example, about 50% or lower, about 40% or lower, about 30% or lower, about 20% or lower, about 1% or lower, about 5% or lower, or about 2% or lower of a charge capacity of the cathode active material layer(s) 12 or 12a and 12b. The charge capacity of the first anode active material layer(s) 22 or 22a and 22b may be, for example, about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the cathode active material layer(s) 12 or 12a and 12b. When the charge capacity of the first anode active material layer(s) 22 or 22a and 22b is too low, a thickness of the first anode active material layer(s) 22 or 22a and 22b is too thin, and lithium dendrites may form between the first anode active material layer(s) 22 or 22a and 22b and the anode current collector(s) 21 or 21a and 21b during repeated charging/discharging processes to destroy the first anode active material layer(s) 22 or 22a and 22b, and thus the cycle characteristics of the all-solid secondary battery 1 may not be improved. When the charge capacity of the first anode active material layer(s) 22 or 22a and 22b is too high, an energy density of the all-solid secondary battery 1 may be deteriorated and internal resistance of the all-solid secondary battery 1 by the first anode active material layer(s) 22 or 22a and 22b may increase, and thus cycle characteristics of the all-solid secondary battery 1 may not be improved.

The charge capacity of the cathode active material layer(s) 12 or 12a and 12b may be obtained by multiplying a weight (mass) of the cathode active material in the cathode active material layer(s) 12 or 12a and 12b by a charge capacity density (mAh/g) of the cathode active material. When various (multiple) types of materials are used as the cathode active material, a value of a charge capacity density x a weight is calculated for each of the cathode active materials, and the sum total of these values is a charge capacity of the cathode active material layer(s) 12 or 12a and 12b. A charge capacity of the first anode active material layer(s) 22 or 22a and 22b may be calculated in substantially the same manner. For example, a charge capacity of the first anode active material layer(s) 22 or 22a and 22b is obtained by multiplying a weight of the anode active material in the first anode active material layer(s) 22 or 22a and 22b by a charge capacity density (mAh/g) of the anode active material. When various types of materials are used as the anode active material, a value of a charge capacity density×a weight of each of the anode active materials is calculated, and the total of these values is a charge capacity of the first anode active material layer(s) 22 or 22a and 22b. Here, the charge capacity densities of the cathode active material and the anode active material are capacities estimated using an all-solid half-cell, in which lithium metal is used as a counter electrode. The charge capacities of the cathode active material layer(s) 12 or 12a and 12b and the first anode active material layer(s) 22 or 22a and 22b are directly measured by charge capacity measurement using an all-solid half-cell. When the measured charge capacity is divided by a weight of each of the active materials, a charge capacity density may be obtained. In some embodiments, the charge capacities of the cathode active material layer(s) 12 or 12a and 12b and the first anode active material layer(s) 22 or 22a and 22b may be initial charge capacities measured in the $1^{st}$ charging cycle.

[Anode Layer: Second Anode Active Material Layer]

The all-solid secondary battery 1 may, for example, further include a second anode active material layer between the anode current collector(s) 21 or 21a and 21b and the first anode active material layer(s) 22 or 22a and 22b. In some embodiments, the all-solid secondary battery 1 may further include a second anode active material layer between the solid electrolyte layer(s) 30 or 30a and 30b and the first anode active material layer(s) 22 or 22a and 22b by (e.g., as a result of) charging. The second anode active material layer may be a plated layer including lithium or a lithium alloy. The plated layer may be plated by charging the battery. The second anode active material layer is a metal layer including lithium or a lithium alloy. The metal layer includes lithium or a lithium alloy. In this regard, for example, because the second anode active material layer is a metal layer including lithium, the second anode active material layer may serve as a lithium reservoir. Non-limiting examples of the lithium alloy include a Li—Al alloy, a Li—Sn alloy, a Li—In alloy, a Li—Ag alloy, a Li—Au alloy, a Li—Zn alloy, a Li—Ge alloy, and a Li—Si alloy, but any material available as a lithium alloy in the art may be used. The second anode active material layer may be formed of a single alloy of lithium, or may be formed of various alloys of lithium.

A thickness of the second anode active material layer may be, for example, about 1 μm to about 1000 μm, about 1 μm to about 500 μm, about 1 μm to about 200 μm, about 1 μm to about 150 μm, about 1 μm to about 100 μm, or about 1 μm to about 50 μm, but embodiments are not limited thereto. When the thickness of the second anode active material layer is too thin, the second anode active material layer may not serve as a lithium reservoir. When the thickness of the second anode active material layer is too thick, a weight and a volume of the all-solid secondary battery 1 may increase, and cycle characteristics may be deteriorated.

In the all-solid secondary battery 1, the second anode active material layer may be disposed between the anode current collector(s) 21 or 21a and 21b and the first anode active material layer(s) 22 or 22a and 22b before assembling the all-solid secondary battery 1, or may be plated between the anode current collector(s) 21 or 21a and 21b and the first anode active material layer(s) 22 or 22a and 22b by charging after assembling the all-solid secondary battery 1. When the second anode active material layer is disposed between the anode current collector(s) 21 or 21a and 21b and the first anode active material layer(s) 22 or 22a and 22b before assembling the all-solid secondary battery 1, the second anode active material layer may be a metal layer including lithium and may thus serve as a lithium reservoir. For example, a lithium foil may be disposed between the anode current collector(s) 21 or 21a and 21b and the first anode active material layer(s) 22 or 22a and 22b before assembling the all-solid secondary battery 1. In this regard, the cycle characteristics of the all-solid secondary battery 1 including the second anode active material layer may be further improved. When the second anode active material layer is plated by charging after assembling the all-solid secondary battery 1, an energy density of the all-solid secondary battery 1 may increase due to not including the second anode active material layer during the assembling of the all-solid secondary battery 1. For example, the all-solid secondary battery 1 may be charged over a charge capacity of the first anode active material layer(s) 22 or 22b. For example, the first anode active material layer(s) 22 or 22a and 22b may be overcharged. At the beginning of the charging, lithium may be absorbed in the first anode active material layer(s) 22 or 22a and 22b. The anode active material in the first anode active material layer(s) 22 or 22a and 22b may form an alloy or a compound with lithium ions migrated (e.g., derived) from the cathode layer 10. When the anode active material layer is charged over the charge capacity of the first anode active material layer(s) 22 or 22a and 22b, for example, lithium may be plated on a back surface of the first anode active material layer(s) 22 or 22a and 22b, which is between the anode current collector(s) 21 or 21a and 21b and the first anode active material layer(s) 22 or 22a and 22b, and a metal layer corresponding to the second anode active material layer may be formed (e.g., plated) by the plated lithium. The second anode active material layer is may be metal layer mainly formed of lithium (e.g., lithium metal). This results because, for example, the anode active material in the first anode active material layer(s) 22 or 22a and 22b is formed of a material capable of forming an alloy or a compound with lithium. In the discharging, lithium in the first anode active material layer 22 and the second anode active material layer (which is a metal layer) is ionized and migrated in a direction to the cathode layer 10. Thus, lithium may be used as an anode active material in the all-solid secondary battery 1. Also, because the first anode active material layer(s) 22 or 22a and 22b cover the second anode active material layer, the first anode active material layer(s) 22 or 22a and 22b may serve as a protection layer for the second anode active material layer, and may suppress or reduce plating growth of lithium dendrites at the same time. Thus, short-circuit and capacity deterioration of the all-solid secondary battery 1 may be suppressed, and, as a result, cycle characteristics of the all-solid secondary battery 1 may be improved. Also, when the second anode active material layer is formed by charging after the assembling of the all-solid secondary battery 1, the anode current collector(s) 21 or 21a and 21b, the first anode active material layer(s) 22 or 22a and 22b, and a region between the anode current collector(s) 21 or 21a and 21b and the first anode active material layer(s) 22 or 22a and 22b may be, for example, Li-free regions substantially not including lithium (Li) in the initial state or a state after the discharging of the all-solid secondary battery 1.

[Anode Layer: Anode Current Collector]

The anode current collector(s) 21 or 21a and 21b may be formed of, for example, a material that does not react with lithium, e.g., a material that does not form an alloy or a compound of lithium. Non-limiting examples of the material to form the anode current collector(s) 21 or 21a and 21b include copper (Cu), stainless steel, titanium (Ti), iron (Fe), cobalt (Co), and nickel (Ni), but any material available as an electrode current collector in the art may be used. The anode current collector(s) 21 or 21a and 21b may be formed of a single metal or an alloy or a combination of at least two metals. The anode current collector(s) 21 or 21a and 21b may be, for example, in the form of a plate or a foil.

The all-solid secondary battery 1 may further include, for example, a thin film including an element that is capable of forming an alloy with lithium on the anode current collector(s) 21 or 21a and 21b. The thin film may be disposed between the anode current collector(s) 21 or 21a and 21b and the first anode active material layer(s) 22 or 22a and 22b. The thin film may, for example, include an element capable of forming an alloy with lithium. Non-limiting examples of the element capable of forming an alloy with lithium include gold, silver, zinc, tin, indium, silicon, aluminum, and bismuth, but any element capable of forming an alloy with lithium in the art may be used. The thin film may be formed of any of these metals or alloys of suitable metals. When the thin film is disposed on the anode current collector(s) 21 or 21a and 21b, for example, as in the second anode active material layer deposited by plating between the thin film and the first anode active material layer(s) 22 or 22a and 22b may further be planarized, and thus the cycle characteristics of the all-solid secondary battery 1 may further be improved.

A thickness of the thin film may be, for example, about 1 nm to about 800 nm, about 10 nm to about 700 nm, about 50 nm to about 600 nm, or about 100 nm to about 500 nm. When the thickness of the thin film is less than 1 nm, the thin film may not function as described above. When the thickness of the thin film is too thick, the thin film itself absorbs lithium, and a deposition amount of lithium in an anode may decrease, resulting in deterioration of an energy density of the all-solid secondary battery 1, and thus cycle characteristics of the all-solid secondary battery 1 may be deteriorated. The thin film may be disposed on the anode current collector(s) 21 or 21a and 21b by, for example, vacuum vapor deposition, sputtering, and/or plating, but embodiments are not limited thereto, and any method capable of forming a thin film in the art may be used.

One or more embodiments will now be described in more detail with reference to the following examples. However, these examples are not intended to limit the scope of the one or more embodiments.

EXAMPLE 1

10 wt % of Porous Solid Electrolyte, 85.5 wt % of Cathode Active Material, $SiO_2$/LiTFSI/MAc (Preparation of Anode Layer)

A Ni foil having a thickness of about 10 μm was prepared as an anode current collector. Carbon black (CB) having an average primary particle diameter of about 30 nm and silver (Ag) particles having an average particle diameter of about 60 nm were prepared as an anode active material.

0.25 g of a powder mixture including the CB and Ag particles at a weight ratio of about 3:1 was added to a container, and 2 g of an NMP solution including 7 wt % of a PVDF binder (#9300 available from Kureha) was added thereto to prepare a solution mixture. Then, the solution mixture was stirred while adding NMP in a small amount to prepare a slurry. The prepared slurry was coated on the Ni foil using a bar coater and dried in a convection oven of about 80° C. for about 10 minutes to obtain a stack. The stack thus obtained was vacuum-dried at about 40° C. for about 10 hours. An anode layer having a first anode active material layer formed on an anode current collector was prepared by the above process.

(Preparation of Solid Electrolyte Layer)

An acrylic binder (SX-A334, available from Zeon Co., Ltd.) was added to octyl acetate to prepare a 4 wt % binder solution. The acrylic binder solution was added to a $Li_6PS_5Cl$ solid electrolyte (D50=3 μm, crystalline), which had argyrodite-type crystals, and the resultant was mixed using a Thinky mixer to prepare a slurry. The slurry included about 1.5 parts by weight of the acrylic binder based on 98.5 parts by weight of the solid electrolyte. The prepared slurry was coated on non-woven fabric using a bar coater and dried in a convection oven of about 80° C. for about 10 minutes to obtain a stack. The stack thus obtained was vacuum-dried at about 70° C. for about 2 hours. A solid electrolyte layer was prepared by the above process.

(Preparation of Anode Layer/Solid Electrolyte Layer Assembly)

The solid electrolyte layer was disposed on the first anode active material layer of the anode layer to prepare a stack. The stack was hot plate press treated at a temperature of about 90° C. and a pressure of about 500 MPa for about 10 min to prepare an anode layer/solid electrolyte layer assembly. The solid electrolyte layer is sintered by undergoing the press treatment, and thus battery characteristics may be improved. A thickness of the sintered solid electrolyte layer was about 45 μm. A thickness of the pressed first anode active material layer was about 7 μm.

(Preparation of Cathode Layer)
(Preparation of Porous Oxide-Based Composite Solid Electrolyte)

LiTFSI was added to N-methylacetamide (n-MAc) to prepare a 20 mol % LiTFSI electrolyte solution. 50.0 mL of tetraethoxy orthosilicate (TEOS) was mixed with 74.0 mL of 26.5 M formic acid aqueous solution to prepare a silica precursor solution. 133.4 g of the 20 mol % LiTFSI electrolyte solution and 255.9 g of the silica precursor solution were mixed to prepare a composition in a gel state. The composition in a gel state was cured to obtain a precipitate. The precipitate was dried in a convection oven of about 50° C. for about 48 hours and vacuum-dried at about 80° C. for about 48 hours to obtain a porous oxide-based composite solid electrolyte powder.

(Preparation of Cathode Active Material Layer)

$LiNi_{0.8}Co_{0.15}Mn_{0.05}O_2$ (NCM) was prepared as a cathode active material. The porous oxide-based composite solid electrolyte prepared as described above was used as a solid electrolyte. A polytetrafluoroethylene (PTFE) binder (Teflon binder available from DuPont) was prepared as a binder. Carbon black (CB) and carbon nanofibers (CNFs) were prepared as a conducting agent. The cathode active material, the porous oxide-based composite solid electrolyte, the carbon black, the carbon nanofibers, and the binder were mixed at a weight ratio of about 85.5:10:1.5:1.5:1.5 with a xylene solvent to prepare a cathode active material composition, and the cathode active material composition was molded into the sheet form and then vacuum-dried at about 40° C. for about 8 hours to prepare a cathode sheet. A gasket of a polypropylene (PP) material was disposed around the cathode sheet to surround side surfaces of the cathode sheet. The cathode sheet surrounded by the gasket was pressed on each of two surfaces of the cathode current collector formed of a carbon-coated aluminum foil having a thickness of about 18 μm to prepare a cathode layer. A thickness of the cathode active material layer and the gasket in the cathode layer was about 100 μm.

Pressing of the cathode sheet on a surface of the cathode current collector was performed at a pressure of about 450 MPa for about 100 ms by roll-pressing.

The cathode active material layer was disposed in the central part of the cathode current collector, and the gasket surrounded the cathode active material layer and was disposed to distal ends of the cathode current collector.

An area of the cathode active material layer was about 90% of an area of the cathode current collector, and the gasket was disposed throughout the remaining 10% of the surface of the cathode current collector on which the cathode active material layer was not disposed.

(Preparation of All-Solid Secondary Battery)

The cathode layer was arranged on the solid electrolyte of the anode layer/solid electrolyte layer assembly to prepare a stack.

The stack was put into a pouch and vacuum-sealed to prepare an all-solid secondary battery.

A part of the cathode current collector and a part of the anode current collector were protruded outside of the battery for use as a cathode layer terminal and an anode layer terminal, respectively.

EXAMPLE 2

10 wt % of Porous Solid Electrolyte, 85.5 wt % of Cathode Active Material, $SiO_2$/LiTFSI/DME An all-solid secondary battery was prepared in substantially the same manner as in Example 1, except that dimethoxyethane (DME) was used as a medium instead of N-methylacetamide (n-MAc) in the preparation of the porous oxide-based composite solid electrolyte.

EXAMPLE 3

5 wt % of Porous Solid Electrolyte, 90.5 wt % of Cathode Active Material, $SiO_2$/LiTFSI/n-MAc An all-solid secondary battery was prepared in substantially the same manner as in Example 1, except that an amount of the porous oxide-based composite solid electrolyte was changed to about 5 wt %, and an amount of the cathode active material was changed to about 90.5 wt % in the preparation of the cathode layer.

EXAMPLE 4

15 wt % of Porous Solid Electrolyte, 80.5 wt % of Cathode Active Material, $SiO_2$/LiTFSI/n-MAc An all-solid secondary battery was prepared in substantially the same manner as in Example 1, except that an amount of the porous oxide-based composite solid electrolyte was changed to about 15 wt %, and an amount of the cathode active material was changed to about 80.5 wt % in the preparation of the cathode layer.

EXAMPLE 5

30 wt % of Porous Solid Electrolyte, 65.5 wt % of Cathode Active Material, $SiO_2$/LiTFSI/n-MAc An all-solid secondary battery was prepared in substantially the same manner as in Example 1, except that an amount of the porous oxide-based composite solid electrolyte was changed to about 30 wt %, and an amount of the cathode active material was changed to about 65.5 wt % in the preparation of the cathode layer.

EXAMPLE 6

10 wt % of Porous Solid Electrolyte, 85.5 wt % of Cathode Active Material, $SiO_2$/LiFSI/n-MAc An all-solid secondary battery was prepared in the substantially same manner as in Example 1, except that LiFSI was used as a lithium salt instead of LiTFSI in the preparation of the porous oxide-based composite solid electrolyte.

EXAMPLE 7

10 wt % of Porous Solid Electrolyte, 85.5 wt % of Cathode Active Material, $SiO_2$/LiTFSI/n-MAc An all-solid secondary battery was prepared in substantially the same manner as in Example 1, except that $Li_2O$—$ZrO_2$ (LZO)-coated $LiNi_{0.8}Co_{0.15}Mn_{0.05}O_2$ (NCM) was used as a cathode active material instead of $LiNi_{0.8}Co_{0.15}Mn_{0.05}O_2$ (NCM) in the preparation of the cathode layer.

The LZO-coated cathode active material was prepared according to the method disclosed in Korean Patent No. 10-2016-0064942, the entire content of which is incorporated herein by reference. A thickness of the LZO coating layer was about 10 nm.

COMPARATIVE EXAMPLE 1

15 wt % of Sulfide-Based Solid Electrolyte, 80.5 wt % of Cathode Active Material, Warm Isostatic Press (WIP)

(Preparation of Anode Layer)

A Ni foil having a thickness of about 10 μm was prepared as an anode current collector. Also, carbon black (CB) having an average primary particle diameter of about 30 nm and silver (Ag) particles having an average particle diameter of about 60 nm were prepared as an anode active material.

0.25 g of a powder mixture including the CB and Ag particles at a weight ratio of about 3:1 was added to a container, and 2 g of an NMP solution including 7 wt % of a PVDF binder (#9300 available from Kureha) was added thereto to prepare a solution mixture. Then, the solution mixture was stirred while adding NMP in a small amount to prepare a slurry. The prepared slurry was coated on the Ni foil using a bar coater and dried in a convection oven of about 80° C. for about 10 minutes to obtain a stack. The stack thus obtained was vacuum-dried at about 40° C. for about 10 hours. An anode layer having a first anode active material layer formed on an anode current collector was prepared by the above process.

(Preparation of Solid Electrolyte Layer)

An acrylic binder (SX-A334, available from Zeon Co., Ltd.) was added to octyl acetate to prepare a 4 wt % binder solution. The acrylic binder solution was added to a $Li_6PS_5Cl$ solid electrolyte (D50=3 μm, crystalline), which was argyrodite-type crystals, and the resultant was mixed using a Thinky mixer to prepare a slurry. The slurry included about 1.5 parts by weight of the acrylic binder based on 98.5 parts by weight of the solid electrolyte. The prepared slurry was coated on non-woven fabric using a bar coater and dried in the air at about 80° C. for about 10 minutes to obtain a stack. The stack thus obtained was vacuum-dried at about 80° C. for about 10 hours. A solid electrolyte layer was prepared by the above process.

(Preparation of Cathode Layer)

$LiNi_{0.8}Co_{0.15}Mn_{0.05}O_2$ (NCM) was prepared as a cathode active material. The porous oxide-based composite solid electrolyte prepared as described above was used as a solid electrolyte. A polytetrafluoroethylene (PTFE) binder (Teflon binder available from DuPont) was prepared as a binder. Carbon black (CB) and carbon nanofibers (CNFs) were prepared as a conducting agent. The cathode active material, the sulfide-based solid electrolyte, the carbon black, the carbon nanofibers, and the binder were mixed at a weight ratio of about 80.5:15:1.5:1.5:1.5 with a xylene solvent to prepare a cathode active material composition, and the cathode active material composition was molded into the sheet form and then vacuum-dried at about 40° C. for about 8 hours to prepare a cathode sheet. A gasket of a polypropylene (PP) material was disposed around the cathode sheet to surround the cathode sheet. The cathode sheet surrounded by the gasket was pressed on one surface of a cathode current collector formed of a carbon-coated aluminum foil having a thickness of about 18 μm to prepare a cathode layer. A thickness of the cathode active material layer and the gasket in the cathode layer was about 100 μm.

The cathode active material layer was disposed in the central part of the cathode current collector, and the gasket surrounded the cathode active material layer and was disposed to distal ends of the cathode current collector. An area of the cathode active material layer was about 90% of an area (e.g., surface area) of the cathode current collector, and the gasket was disposed throughout the remaining 10% of the surface of the cathode current collector on which the cathode active material layer was not disposed.

(Preparation of All-Solid Secondary Battery)

The solid electrolyte layer was arranged on one surface of the cathode layer, and the anode layer was disposed on the solid electrolyte layer such that the first anode active material contacted the solid electrolyte layer to prepare a stack. The stack was warm isostatic press treated at a temperature of about 80° C. and a pressure of about 500 MPa for about 30 min. By this pressing, the solid electrolyte layer was sintered to improve battery characteristics. A thickness of the sintered solid electrolyte layer was about 45 μm. A thickness of the pressed first anode active material layer was about 7 μm.

The pressed stack was put into a pouch and vacuum-sealed to prepare an all-solid secondary battery. A part of the cathode current collector 11 and a part of the anode current collector(s) 21 or 21a and 21b were protruded outside of the battery and were respectively used as a terminal of the cathode layer 10 and a terminal of the anode layer(s) 20 or 20a and 20b.

COMPARATIVE EXAMPLE 2

15 wt % of Sulfide-Based Solid Electrolyte, 80.5 wt % of LZO-Coated Cathode Active Material, No First Anode Active Material Layer, Warm Isostatic Press An all-solid secondary battery was prepared in substantially the same manner as in Comparative Example 1, except that only a Ni anode current collection was used without forming a first anode active material layer, and $Li_2O$—$ZrO_2$ (LZO)-coated $LiNi_{0.8}Co_{0.15}Mn_{0.05}O_2$ (NCM) was used as a cathode active material instead of $LiNi_{0.8}Co_{0.15}Mn_{0.05}O_2$ (NCM) in the preparation of the cathode layer 10.

COMPARATIVE EXAMPLE 3

No First Anode Active Material Layer

An all-solid secondary battery was prepared in substantially the same manner as in Comparative Example 1, except that only a Ni anode current collection was used without forming a first anode active material layer.

COMPARATIVE EXAMPLE 4

Ni Alone

An all-solid secondary battery was prepared in substantially the same manner as in Comparative Example 1, except that nickel (Ni) particles having an average particle diameter of about 100 nm was used as an anode active material instead of a mixture including furnace black (FB—C) having a primary particle diameter of about 30 nm to silver (Ag) particles having an average particle diameter of about 60 nm at a weight ratio of about 3:1.

EVALUATION EXAMPLE 1

Charge and Discharge Test

Charge and discharge characteristics of the all-solid secondary batteries prepared in Examples 1 to 7 and Comparative Examples 1 to 4 were evaluated by the following charge and discharge test. The charge and discharge test was performed by putting the all-solid secondary battery in a thermostat at about 45° C.

In the $1^{st}$ cycle, the battery was charged at a constant current of about 0.6 mA/cm$^2$ for about 12.5 hours until a battery voltage reached about 3.9 V to about 4.25 V. Then, the battery was discharged at a constant current of about 0.6 mA/cm$^2$ for about 12.5 hours until a battery voltage reached about 2.5 V. A discharge capacity of the $1^{st}$ cycle was used as a standard capacity. In the $2^{nd}$ and following cycles, the charging and discharging were performed using substantially the same conditions as in the $1^{st}$ cycle, up to the $120^{th}$ cycle. Lifespan characteristics of the batteries with respect to the cycle number at which a discharge capacity reached about 80% of the standard capacity after the $2^{nd}$ cycle were categorized by the following evaluation standards in Table 1.

The occurrence or absence of a short circuit during the charging and discharging process was evaluated, and the results are shown in Table 1. The term "short circuit" denotes occurrence of a short circuit.

Evaluation Standard
x: $2^{nd}$ cycle to $5^{th}$ cycle
Δ: $6^{th}$ cycle to $50^{th}$ cycle
○: $100^{th}$ cycle or cycle thereafter

TABLE 1

|  | In evaluation Short circuit occurrence | Lifespan characteristics |
| --- | --- | --- |
| Example 1 | — | ○ |
| Example 2 | — | Δ |
| Example 3 | — | Δ |
| Example 4 | — | ○ |
| Example 5 | — | Δ |
| Example 6 | — | Δ |
| Example 7 | — | ○ |
| Comparative Example 1 | — | Δ |
| Comparative Example 2 | Short circuit | x |
| Comparative Example 3 | Short circuit | x |
| Comparative Example 4 | Short circuit | x |

The cycle number at which the all-solid secondary batteries of Examples 1 to 7 reached about 80% of the standard capacity was 6 or higher, and thus the lifespan characteristics were good.

The cycle number at which the all-solid secondary batteries of Examples 1, 4, and 7 reached about 80% of the standard capacity was 100 or higher, and thus the lifespan characteristics were excellent.

The cycle number at which the all-solid secondary battery of Comparative Example 1 reached about 80% of the standard capacity was 6 or higher, and thus the lifespan characteristics were good.

Therefore, the all-solid secondary batteries of Examples 1 to 7 had similar or better lifespan characteristics than the all-solid secondary battery of Comparative Example 1.

However, the cycle number at which the all-solid secondary battery of Comparative Example 2 reached about 80% of the standard capacity was 5 or lower, and thus the lifespan characteristics were poor, and a short circuit occurred before reaching the $5^{th}$ cycle.

The all-solid secondary batteries of Comparative Examples 3 and 4 had a short circuit occur during the charging or discharging process of the $1^{st}$ cycle.

In the all-solid secondary batteries of Examples 1 to 7, it was confirmed that after the charging at the $1^{st}$ cycle was completed, a plated layer (e.g., a lithium metal layer) corresponding to the second anode active material layer was formed (e.g., plated) between the first anode active material layer and the anode current collector according to scanning electron microscope (SEM) images of cross sections of the batteries.

As described above, the all-solid secondary battery according to the present embodiment may be applied to various portable devices and vehicles.

According to an aspect or one or more embodiments, it is possible to provide an all-solid secondary battery capable of preventing or reducing a short circuit and having improved cycle characteristics when a cathode layer and a solid electrolyte layer of the all-solid secondary battery include electrolytes different from each other.

As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It will be understood that the embodiments described herein should be considered in a descriptive sense only and not for purposes of limitation. Descriptions of features or aspects within each embodiment should typically be considered as being available for other similar features or aspects in other embodiments. While one or more embodiments have been described with reference to the drawings, it will be understood by those of ordinary skill in the art that various changes in form and details may be made therein without departing from the spirit and scope of the disclosure as defined by the following claims and equivalents thereof.

What is claimed is:

1. An all-solid lithium secondary battery comprising:
a cathode layer;
an anode layer; and
a solid electrolyte layer between the cathode layer and the anode layer,
wherein the cathode layer comprises a cathode current collector and a cathode active material layer on the cathode current collector,
wherein the anode layer comprises an anode current collector and a first anode active material layer on the anode current collector,
wherein the cathode active material layer comprises a porous oxide-based composite solid electrolyte and a cathode active material, and
wherein the solid electrolyte layer conducts lithium ion and comprises a sulfide-based solid electrolyte.

2. The all-solid secondary battery of claim 1, wherein the porous oxide-based composite solid electrolyte comprises a porous oxide matrix, and an electrolyte in pores of the porous oxide matrix.

3. The all-solid secondary battery of claim 2, wherein the porous oxide matrix comprises at least one selected from $SiO_2$, $Al_2O_3$, $ZrO_2$, $TiO_2$, ZnO, $SnO_2$, and $CeO_2$.

4. The all-solid secondary battery of claim 2, wherein the porous oxide matrix comprises ordered mesoporous pores.

5. The all-solid secondary battery of claim 2, wherein the electrolyte comprises a lithium salt and a medium, and
wherein the medium comprises at least one selected from an organic solvent and an ionic liquid.

6. The all-solid secondary battery of claim 5, wherein the lithium salt comprises at least one selected from $LiN(SO_2F)_2$ (LiFSI), $LiN(SO_2CF_3)_2$ (LiTFSI), LiSCN, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiSbF_6$, $LiPF_3(CF_2CF_3)_3$, $LiPF_3(CF_3)_3$, and $LiB(C_2O_4)_2$.

7. The all-solid secondary battery of claim 5, wherein the organic solvent comprises at least one selected from N-methylacetamide, ethylene carbonate, propylene carbonate, dimethyl carbonate, fluoroethylene carbonate, diethyl carbonate, ethylmethyl carbonate, poly(ethylene glycol) dimethyl ether (PEGDME, polyglyme), tetra(ethylene glycol) dimethyl ether (TEGDME, tetraglyme), tri(ethylene glycol)dimethyl ether (triglyme), poly(ethylene glycol) dilaurate (PEGDL), poly(ethylene glycol) monoacrylate (PEGMA), poly(ethylene glycol) diacrylate (PEGDA), 3-dioxolane, 4,5-diethyl-1,3-dioxolane, 4,5-dimethyl-1,3-dioxolane, 4-methyl-1,3-dioxolane, 4-ethyl-1,3-dioxolane, 2,2-dimethoxy-2-phenylacetophenone, 1,2-dimethoxyethane (DME), 1,2-diethoxyethane, tetrahydrofuran, gamma butyrolactone, 1,1,2,2-tetrafluoroethyl 2,2,3,3-tetrafluoropropyl ether, succinonitrile, adiponitrile, sulfolane, dimethylsulfone, ethylmethylsulfone, and diethylsulfone.

8. The all-solid secondary battery of claim 5, wherein the ionic liquid is a compound comprising:
at least one cation selected from an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, and a mixture thereof; and
at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

9. The all-solid secondary battery of claim 5, wherein the porous oxide-based composite solid electrolyte comprises about 50 parts by weight to about 70 parts by weight of the porous oxide matrix, about 20 parts by weight to about 20 parts by weight of the lithium salt, and about 5 parts by weight to about 10 parts by weight of the medium based on 100 parts by weight of the porous oxide-based composite solid electrolyte.

10. The all-solid secondary battery of claim 1, wherein an amount of the porous oxide-based composite solid electrolyte is about 1 wt % to about 30 wt % based on the total weight of the cathode active material layer.

11. The all-solid secondary battery of claim 1, further comprising an inactive member on a peripheral part of the cathode current collector, surrounding one or more side surfaces of the cathode active material layer, and extending to a distal end of the cathode current collector.

12. The all-solid secondary battery of claim 1, further comprising a carbon layer between the cathode current collector and the cathode active material layer.

13. The all-solid secondary battery of claim 1, wherein the sulfide-based solid electrolyte comprises at least one selected from $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—$LiCl_7Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$ZmSn$ (where m and n are each a positive number, and Z is one of Ge, Zn, or Ga), $Li_2S$—$GeS_2$, $Li_2S$—$SiS_2$—$Li_3PO_4$, and $Li_2S$—$SiS_2$—$Li_pMO_q$ (where p and q are each a positive number, and M is one of P, Si, Ge, B, Al, Ga, or In).

14. The all-solid secondary battery of claim 1, wherein the sulfide-based solid electrolyte comprises at least one selected from $Li_7P_3S_{11}$, $Li_7PS_6$, $Li_4P_2S_6$, $Li_3PS_6$, $Li_3PS_4$, and $Li_2P_2S_6$.

15. The all-solid secondary battery of claim 1, wherein the sulfide-based solid electrolyte comprises an argyrodite-type solid electrolyte represented by Formula 1:
Formula 1;
$Li^+{}_{12-n-x}A^{n+}X^{2-}{}_{6-x}Y^-{}_x$, and
wherein, in Formula 1:
A is P, As, Ge, Ga, Sb, Si, Sn, Al, In, Ti, V, Nb, or Ta,
X is S, Se, or Te,
Y is Cl, Br, I, F, CN, OCN, SCN, or $N_3$, $1 \leq n \leq 5$, and $0 \leq c \leq 2$.

16. The all-solid secondary battery of claim 15, wherein the argyrodite-type solid electrolyte is at least one selected from $Li_{7-x}PS_{6-x}Cl_x$ (where $0 \leq x \leq 2$), $Li_{7-x}PS_{6-x}Br_x$ (where $0 \leq x \leq 2$), and $Li_{7-x}PS_{6-x}I_x$ (where $0 \leq x \leq 2$).

17. The all-solid secondary battery of claim 1, wherein the first anode active material layer comprises an anode active material and a binder,
wherein the anode active material is in the form of particles, and
wherein an average particle diameter of the anode active material is about 4 µm or less.

18. The all-solid secondary battery of claim 17, wherein the anode active material comprises at least one selected from a carbonaceous anode active material and a metal or metalloid anode active material, and
wherein the carbonaceous anode active material comprises at least one selected from amorphous carbon and crystalline carbon.

19. The all-solid secondary battery of claim 18, wherein the metal or metalloid anode active material comprises at least one selected from the group consisting of gold (Au), platinum (Pt), palladium (Pd), silicon (Si), silver (Ag), aluminum (Al), bismuth (Bi), tin (Sn), and zinc (Zn).

20. The all-solid secondary battery of claim 1, further comprising a second anode active material layer between the anode current collector and the first anode active material layer,
  wherein the second anode active material layer is a plated layer or a metal layer comprising lithium or a lithium alloy.

* * * * *

UNITED STATES PATENT AND TRADEMARK OFFICE
CERTIFICATE OF CORRECTION

PATENT NO. : 11,769,874 B2
APPLICATION NO. : 17/090597
DATED : September 26, 2023
INVENTOR(S) : Minsuk Lee It is certified that error appears in the above-identified patent and that said Letters Patent is hereby corrected as shown below:

In the Claims

In Column 25, Line 34, in Claim 6, delete "LiClO$_4$," and insert -- LiClO$_4$, --.

In Column 25, Line 64, in Claim 8, delete "PF$_6$," and insert -- PF$_6^-$ --.

In Column 25, Line 64, in Claim 8, delete "AsF$_6$," and insert -- AsF$_6^-$, --.

In Column 25, Line 65, in Claim 8, delete "HSO$_4$," and insert -- HSO$_4^-$, --.

In Column 25, Line 66, in Claim 8, delete "(C$_2$F$_5$SO$_2$)$_2$N$^-$" and insert -- (C$_2$F$_5$SO$_2$)$_2$N$^-$, --.

In Column 26, Lines 26-27, in Claim 13, delete "Li$_2$S—SiS$_2$—LiCl$_7$Li$_2$S" and insert -- Li$_2$S—SiS$_2$—LiCl, Li$_2$S --.

In Column 26, Line 40, in Claim 15, delete "Formula 1;" and insert -- Formula 1 --.

In Column 26, Line 46, in Claim 15, delete "$0 \leq c \leq 2$." and insert -- $0 \leq x \leq 2$. --.

Signed and Sealed this
Ninth Day of January, 2024

Katherine Kelly Vidal
*Director of the United States Patent and Trademark Office*